United States Patent
Safaee-Rad et al.

(10) Patent No.: US 8,462,227 B2
(45) Date of Patent: Jun. 11, 2013

(54) DIGITAL CAMERA MODULE WHITE BALANCE CALIBRATION METHOD AND APPARATUS USING ONLY SINGLE ILLUMINATION SOURCE DATA

(75) Inventors: Reza Safaee-Rad, Etobicoke (CA); Milivoje Aleksic, Richmond Hill (CA)

(73) Assignee: ATI Technologies ULC, Markham, Ontario (CA)

( * ) Notice: Subject to any disclaimer, the term of this patent is extended or adjusted under 35 U.S.C. 154(b) by 514 days.

(21) Appl. No.: 12/429,847

(22) Filed: Apr. 24, 2009

(65) Prior Publication Data

US 2010/0271503 A1  Oct. 28, 2010

(51) Int. Cl.
  H04N 9/73  (2006.01)
  H04N 17/00  (2006.01)
  H04N 5/222  (2006.01)
  G06K 9/00  (2006.01)

(52) U.S. Cl.
  USPC ......... 348/223.1; 348/187; 348/370; 382/167

(58) Field of Classification Search
  USPC .......... 348/223.1, 187, 188, 370, 371, 225.1; 382/167
  See application file for complete search history.

(56) References Cited

U.S. PATENT DOCUMENTS

| | | | |
|---|---|---|---|
| 5,216,493 A | 6/1993 | DiBella et al. | |
| 6,952,225 B1* | 10/2005 | Hyodo et al. | 348/223.1 |
| 7,146,040 B2* | 12/2006 | Johannesson et al. | 382/167 |
| 7,265,781 B2* | 9/2007 | Noguchi | 348/223.1 |
| 2003/0098916 A1* | 5/2003 | Noguchi | 348/272 |
| 2005/0219379 A1* | 10/2005 | Shi | 348/223.1 |
| 2008/0143844 A1* | 6/2008 | Innocent | 348/223.1 |
| 2009/0201374 A1* | 8/2009 | Hung et al. | 348/187 |

* cited by examiner

Primary Examiner — Nhan T Tran
(74) Attorney, Agent, or Firm — Faegre Baker Daniels LLP

(57) ABSTRACT

A method includes determining white balance calibration color ratios for a plurality of illumination sources by using a representative camera of a given type to establish a set of ratios. Because the ratios are fixed for the given camera type, a plurality of cameras of the type may store the fixed ratios, and calibrate by measuring only the reference illumination source. Later white balancing is achieved by using the measured reference illumination source color ratios and the stored fixed ratios as scaling factors to map from the reference illumination source to any other illumination source. The method includes an off-line advance calibration procedure to obtain the fixed ratios, an on-line per camera calibration procedure to obtain color ratios for the reference source, and subsequent white balancing which uses the fixed ratios/scaling factors and the reference source color ratios.

17 Claims, 14 Drawing Sheets

Table 1: G/R & G/B for 3 illumination sources

| Module No. | Tungsten | | TL-84 | | D65 (Metal Halide) | |
|---|---|---|---|---|---|---|
| | G/R | G/B | G/R | G/B | G/R | G/B |
| A | 1.27 | 1.83 | 1.50 | 1.68 | 1.82 | 1.08 |
| B | 1.18 | 1.77 | 1.43 | 1.61 | 1.73 | 1.05 |
| C | 1.12 | 1.75 | 1.35 | 1.60 | 1.62 | 1.02 |
| D | 1.18 | 1.78 | 1.39 | 1.60 | 1.69 | 1.05 |
| Total Deviation (%) | 12.6 | 4.6 | 11.0 | 4.5 | 11.9 | 5.3 |
| Average Total Dev. (%) | 11.8 | | | | 4.8 | |

Note: Total deviation (%) is defined as: (Max-Min) * 100 / Ave.

FIG. 16

Table 2: Color-Neutral G/R & G/B

| Module No. | G/R | G/B |
|---|---|---|
| A | 1.78 | 1.09 |
| B | 1.70 | 1.06 |
| C | 1.56 | 1.05 |
| D | 1.66 | 1.06 |
| Total Deviation (%) | 13.1 | 3.8 |

FIG. 17

Table 3: G/R & G/B for 3 illumination sources

| Module No. | Tungsten | | TL-84 | | D65 (Metal Halide) | |
|---|---|---|---|---|---|---|
| | G/R | G/B | G/R | G/B | G/R | G/B |
| A | 1.32 | 1.83 | 1.54 | 1.68 | 1.85 | 1.07 |
| B | 1.25 | 1.77 | 1.46 | 1.62 | 1.78 | 1.04 |
| C | 1.15 | 1.74 | 1.37 | 1.60 | 1.64 | 1.03 |
| D | 1.22 | 1.77 | 1.43 | 1.62 | 1.74 | 1.03 |
| Total Deviation (%) | 13.8 | 5.1 | 11.7 | 4.9 | 12.0 | 3.8 |
| Average Total Dev. (%) | 12.5 | | | | 4.6 | |

FIG. 18

Table 4: Difference between two methods' results

| Module No. | Tungsten | | TL-84 | | D65 (Metal Halide) | |
|---|---|---|---|---|---|---|
| | G/R | G/B | G/R | G/B | G/R | G/B |
| A | -0.05 | 0.00 | -0.04 | 0.00 | -0.03 | 0.01 |
| B | -0.07 | 0.00 | -0.03 | -0.01 | -0.05 | 0.01 |
| C | -0.03 | 0.01 | -0.02 | 0.00 | -0.02 | -0.01 |
| D | -0.04 | 0.01 | -0.04 | -0.02 | -0.05 | 0.02 |
| Ave. Diff. | 0.05 | 0.004 | 0.03 | 0.01 | 0.04 | 0.01 |

Note: Difference is defined as "Direct Data - Spectral Data".

FIG. 19

Table 5: Difference between two methods' results in (%)

| Module No. | Tungsten | | TL-84 | | D65 (Metal Halide) | |
|---|---|---|---|---|---|---|
| | G/R | G/B | G/R | G/B | G/R | G/B |
| A | -4.2 | 0.0 | -2.4 | -0.3 | -1.7 | 0.7 |
| B | -6.1 | 0.2 | -2.4 | -0.6 | -2.8 | 1.0 |
| C | -2.9 | 0.4 | -1.7 | 0.2 | -1.5 | -0.7 |
| D | -3.1 | 0.5 | -2.7 | -1.1 | -3.1 | 1.5 |
| Ave. Diff. | 4.06 | 0.22 | 2.31 | 0.39 | 2.24 | 1.00 |

Note: Difference in (%) is defined as "(Direct Data - Spectral Data) / Direct Data".

FIG. 20

Table 6: Mapping scale factors

| Module No. | Tungsten | | TL-84 | | D65 (Metal Halide) | |
|---|---|---|---|---|---|---|
| | G/R | G/B | G/R | G/B | G/R | G/B |
| A | 0.74 | 1.68 | 0.87 | 1.54 | 1.04 | 0.98 |
| B | 0.74 | 1.67 | 0.86 | 1.53 | 1.05 | 0.98 |
| C | 0.74 | 1.66 | 0.88 | 1.52 | 1.05 | 0.98 |
| D | 0.73 | 1.67 | 0.86 | 1.53 | 1.05 | 0.97 |
| Average | 0.74 | 1.67 | 0.87 | 1.53 | 1.05 | 0.98 |

FIG. 21

DIGITAL CAMERA MODULE WHITE BALANCE CALIBRATION METHOD AND APPARATUS USING ONLY SINGLE ILLUMINATION SOURCE DATA

FIELD OF THE DISCLOSURE

The present disclosure is related generally to digital camera testing and calibration and more specifically to methods and apparatuses for digital camera white balance calibration.

BACKGROUND

Digital cameras, and related digital camera modules that make up a digital camera, perform a white balancing operation upon capturing an image. A digital camera module also undergoes testing and calibration processes, such as white balance calibration, during manufacturing, and this includes digital cameras included in electronic devices such as mobile telephones.

Unlike the human eye, which has the capability to automatically adjust to lighting conditions to properly perceive white, as well as other colors, camera modules must be calibrated in advance so as to accommodate varying light sources. However, digital camera modules vary from camera module to camera module with respect to their spectral response characteristics and therefore, white balance calibration would be most accurate if each digital camera module were individually tested and calibrated. As one would understand, such a calibration process is time consuming and therefore also has an associated cost, thereby increasing the overall production costs associated with digital cameras.

White balance calibration under a given illumination source is accomplished by, for example, illuminating a known image reference surface (such as a standard white card) with a light source and measuring red, green and blue, that is, the R/G/B camera module's spectral responses with respect to red, green and blue wavelengths. Where one of the wavelengths exhibits a peak, or a higher amplitude than other wavelengths, according to measured R/G/B responses, a set of appropriate gains may be applied such that the overall spectral R/G/B responses are equalized with respect to all spectral wavelengths (i.e. colors). That is, adjustments may be made such that the camera module correctly "perceives" white for the given illumination source under calibration test. However, such response gain adjustments, which may also be referred to as a "gain adjustments scaling factors," are specific to the light source tested, and do not apply to other light sources having different spectral characteristics. Therefore, testing time is further increased, due to the need to test each of the light sourced individually, in order to create a set of gain values scaling factors appropriate for that particular light source.

Therefore, what is needed are methods and apparatuses for reducing the test and calibration time, and therefore the cost, associated with calibration of digital camera devices.

BRIEF DESCRIPTION OF THE DRAWINGS

FIG. 16 is a table (Table 1) of Green/Red and Green/Blue ratios for four exemplary camera modules and for three different illumination sources.

FIG. 17 is a table (Table 2) of Green/Red and Green/Blue ratios for four exemplary camera modules for a color neutral illumination source.

FIG. 18 is a table (Table 3) of Green/Red and Green/Blue ratios for four exemplary camera modules and for three different illumination sources determined using spectral-based methods in accordance with the embodiments.

FIG. 19 is a table (Table 4) of differences in results obtained using spectral based method versus direct capture method for Green/Red and Green/Blue ratios for the four exemplary camera modules and for three different illumination sources.

FIG. 20 is a table (Table 5) of percentage differences in results obtained using spectral based method versus direct capture method for Green/Red and Green/Blue ratios for the four exemplary camera modules and for three different illumination sources.

FIG. 21 is a table (Table 6) illustrating an exemplary mapping of color neutral illumination data to Tungsten, TL-84 and D65 metal halide illumination sources in accordance with the embodiments.

DETAILED DESCRIPTION

Figure 1:
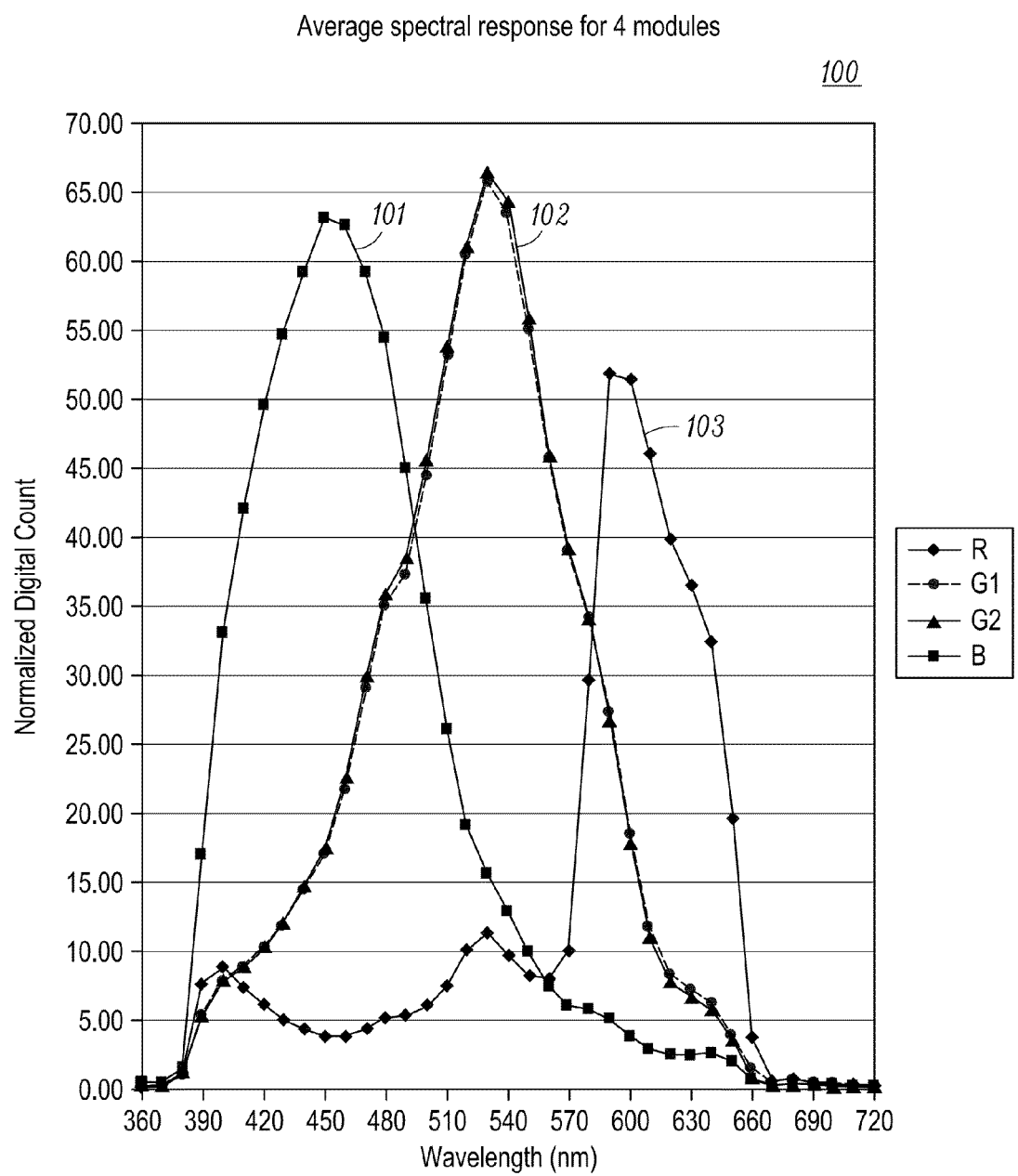
FIG. 1 is a graph of the average spectral response of four exemplary camera modules having an RGGB filter pattern.

In accordance with the embodiments, per-module (digital camera module) initial white-balance calibration (also referred to as pre-gain estimation) for any set of desired target illumination sources may be achieved using only a single reference illumination source. Unlike previous methods, the method of the embodiments does not require all target illumination sources to be used during calibration, and as a result, saves time and cost for digital camera module initial white balance calibration.

In accordance with the embodiments, mapping Green/Red (G/R) and Green/Blue (G/B) ratios (i.e., "pre-gain" values for the initial white balance process), based on an approximately color-neutral illumination source, to G/R and G/B ratios based on a specific illumination source (e.g., Tungsten, TL-84 and D65), requires fixed (that is, constant) scale factors. These fixed scale factors are independent of module to module variation. Further, because the mapping scale factors between the approximately color-neutral illumination source and any other illumination source are fixed, a mapping between any illumination source to any other illumination source is likewise fixed, and may thus be determined in accordance with the embodiments.

Based on the observation of such fixed scale factors, the various embodiments provide procedures for in-factory per-module calibration of G/R and G/B ratios for various required illumination sources, in a time and cost saving manner, because only a single illumination source need be measured.

The embodiments include an "off-line" characterization wherein a Spectral Power Distribution (SPD) of a spectrally-stable illumination source, for example an LED-based D55 illumination source, is established. In accordance with the embodiments, D55 is a suitable and desired illumination source because it provides a close approximation of a color-neutral illumination source. However, for the various embodiments, any other spectrally stable illumination source may be used for this purpose. Based on the SPD of the selected illumination source, mapping scale factors for all the required illumination sources (e.g., Tungsten, TI-84, indoor D65, outdoor D50, D55, D60 and D65) are established. The embodiments also include an "on-line" (that is, in-factory) per-module calibration, wherein each camera module to be calibrated captures an image from a test scene and establishes the G/R and G/B ratios specific to each camera module with respect to the reference illumination source, that is, using only that single illumination source.

In accordance with the embodiments, G/R and G/B ratios for all target illumination sources are then estimated using the G/R and G/B ratios established in the of on-line calibration phase, and the scale factors that were estimated in advance in the off-line characterization phase. Each camera module obtains the set of fixed scale factors, determined in the off-line procedure, by having them loaded into memory prior to the on-line calibration phase. Thus the various embodiments provide a faster and simpler per-module initial white-balance calibration method than previous methods. In the context of production lines, cost savings may be achieved due to the reduced calibration time required per module. Other advantages include requiring only a minimal amount of memory space for calibration while providing an improvement in the quality of color images.

Turning now to the drawings, examples will be provided for obtaining white balance calibration scaling factors in accordance with the embodiments. FIG. 1 is a graph 100 of the average spectral response of four exemplary camera modules, A, B, C, and D, having an RGGB Bayer filter pattern. The spectral responses shown are exemplary, and were normalized with respect to exposure time. For this example measurement, a 300 W Xenon arc lamp was utilized as the illumination source. The measurements may be obtained using, for example, a monochromator, an integrating sphere and an optical meter, in conjunction with the Xenon illumination source. The spectral response is shown for the blue 101, green 102 (green 1 and green 2), and red 103 for the RGGB Bayer pattern.

Figure 2:
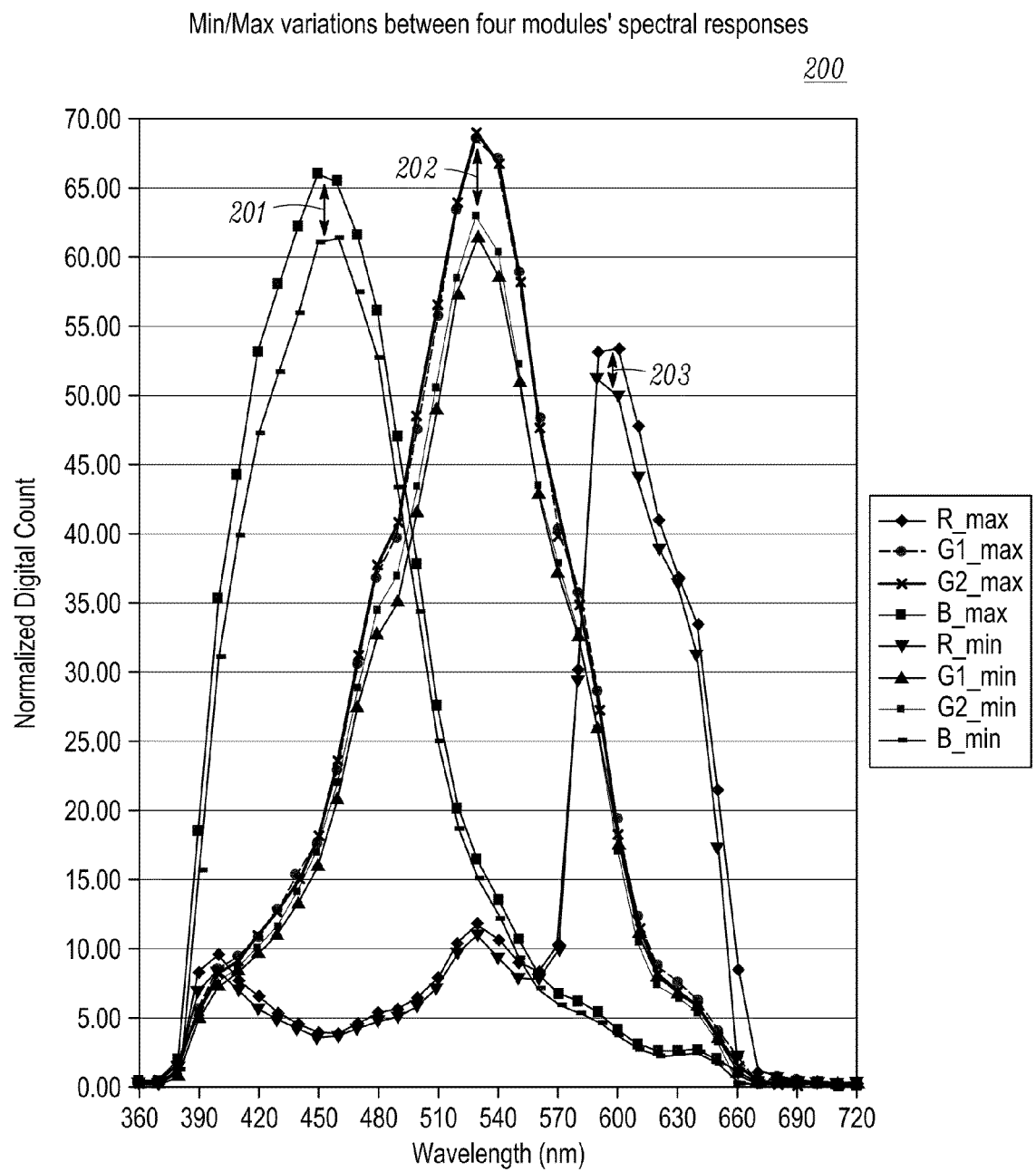
FIG. 2 is graph of the minimum and maximum variations in the spectral responses of the four exemplary camera modules.

The minimum and maximum variations in the spectral response of the four exemplary camera modules is illustrated in the graph 200 of FIG. 2, and is illustrated by way of minimum and maximum plots so that the variations, for example blue variation 201, green variation 202 and red variation 203 may be observed. The variation in response between the modules A, B, C and D is exemplary of the need for individual, initial, per-module white balance calibration.

Figure 3:
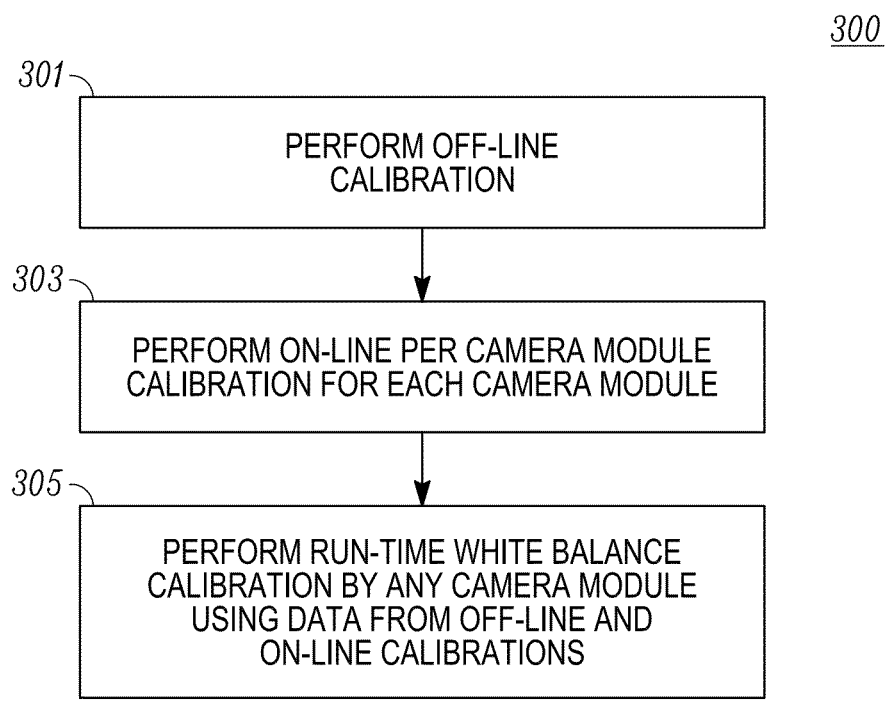
FIG. 3 is a flow chart that summarizes the procedures of the embodiments for white balance calibration.

The embodiments provide data such that a camera may perform white balance calibration at the time of capturing an image, that is, "run-time" white balance calibration, to obtain good quality images. The flow chart 300 in FIG. 3 summarize the procedures in accordance with the embodiments. An off-line calibration procedure is performed as in 301 using either a "direct capture" method or a spectral method. Next, in 303, for each camera module to be calibrated, an on-line calibration is performed which requires capturing a test image using a reference illumination source to determine camera module specific G/R and G/B ratios. Subsequent to the above two procedures, any of the camera modules may perform run-time white balancing, as shown in 305, by using the data obtained in 301 and 303.

Figure 4:
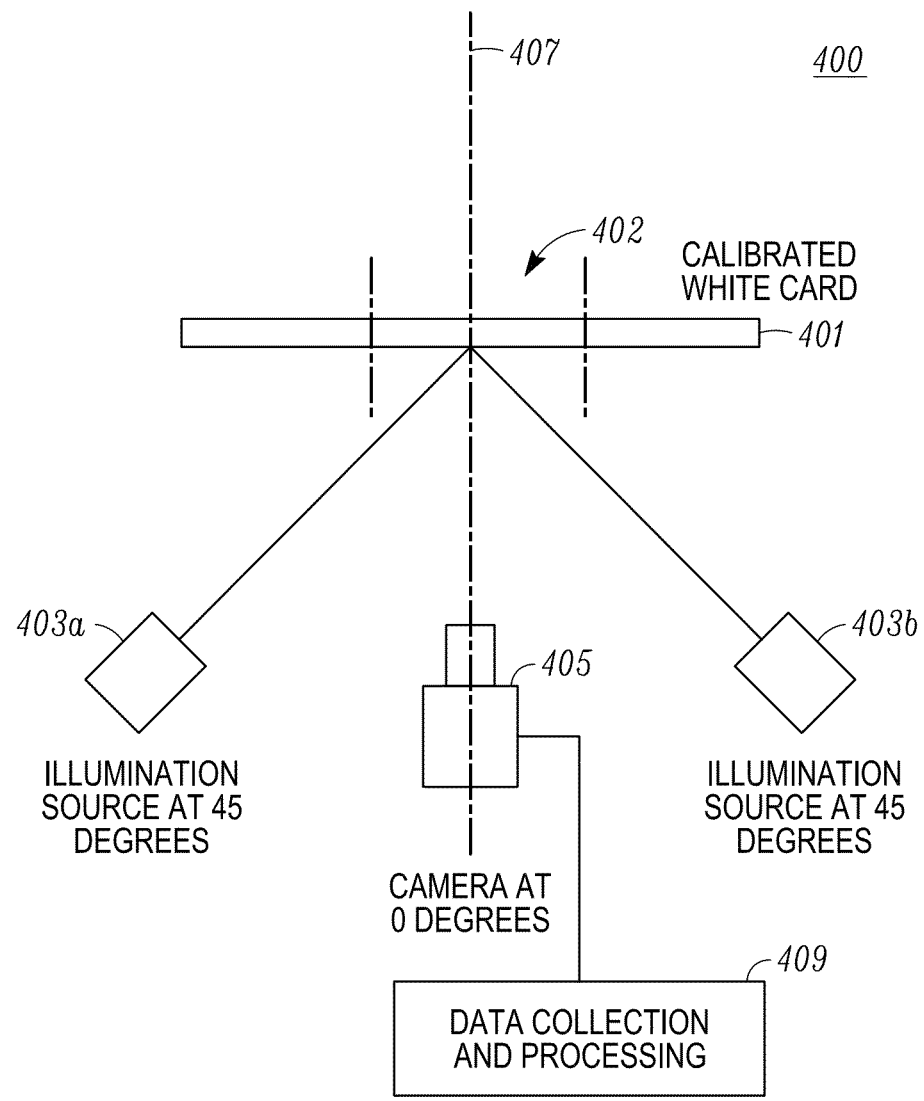
FIG. 4 is a block diagram of a test setup for performing off-line advance calibration by a direct-capture method using a camera of a given model or type, in accordance with the embodiments.

The off-line calibration procedure of the embodiments will now be described. In the off-line advance calibration procedure, two illumination sources 403*a*, 403*b* may be used, positioned at 45° angles with respect to a centerline 407. A camera 405 is positioned on the centerline 407 with respect to a Region of Interest (ROI) 402 on a calibrated white card 401. In an alternative example test setup, a calibrated translucent white sheet may be back illuminated by light source, (such as a fiber-optic back-illumination source) with the camera being positioned as shown in FIG. 4. Test setup 400, and any alternative test setup that uses a camera as shown, is referred to herein as the "direct capture" method for off-line calibration. That is, a representative camera, which may be for example, a camera of a certain model or type, is used to perform the off-line procedure. For any given illumination source, a BAYER/RAW image is captured from the calibrated white card 401 and the G/R and G/B ratios are estimated accordingly using the ROI 402 of the captured image (e.g., center 64×64 pixels per R/G1/G2/B channel). Based on this test setup 400, the two ratios for a set of illumination sources can be established. Subsequently, one of the ratio sets is defined as a reference and the required scaling factors to map from the reference ratios to all other illumination source ratios is estimated in advance and stored. This information may then later be loaded into the memory of a plurality of camera modules.

For example, the data collection and processing unit 409 may be a laptop or a PC and may store the data for later distribution to various memory devices (such as memory cards) that may be installed in various camera modules. In another example, various camera modules may be connected to the data collection and processing unit 409 and download data to memory or have the data uploaded from the data collection and processing unit 409 to memory. Any appropriate approach may be used in the embodiments for storing the direct-capture off-line calibration data to a plurality of camera modules.

Figure 5:
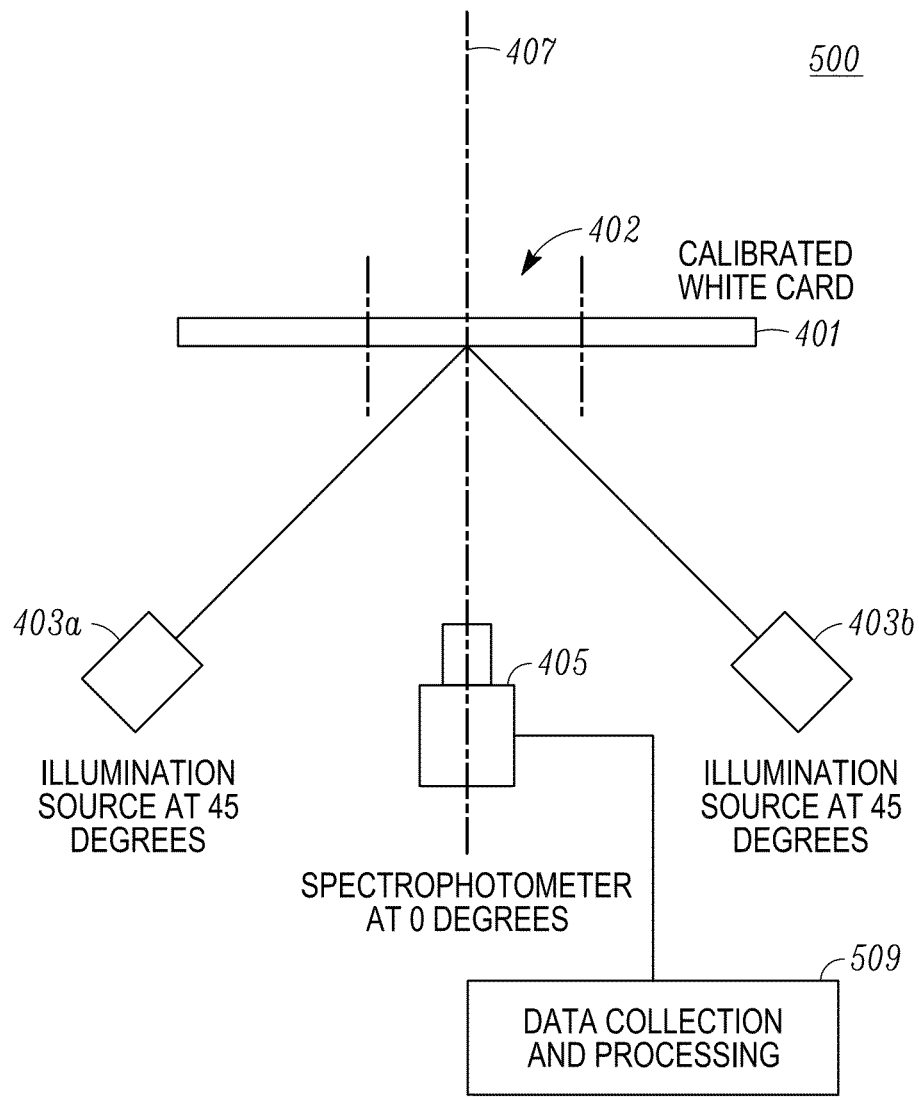
FIG. 5 is a block diagram of a test setup for performing off-line advance calibration by a spectral method, measuring the spectral response of various illumination sources using a spectrophotometer in accordance with the embodiments.

An alternative to the direct-capture method for off-line calibration is illustrated in FIG. 5 and is referred to herein as the spectral method 500. The spectral method 500 is used to establish Spectral Power Distribution (SPD) of the illumination source which can be established using the measurement done by spectrophotometer 505 and the spectral reflectance/transmittance of the calibrated white sheet 401. The test setup is the same as shown in FIG. 4, except that a spectrophotometer 505 replaces the camera 405. However, it is to be understood that FIG. 5 is not intended to be a complete schematic of the test setup and therefore other items may be required in order to perform the measurements, such as a diffuser, lens, etc., as would be understood by one of ordinary skill. Also, it is to be understood that SPD data for various illumination sources may be readily available in publications and therefore the published data may be used and there may be no need to perform the measurements using the test setup shown in FIG. 5. For example, the International Commission on Illumination, (or "CIE" for its French name Commission internationale de l'éclairage), has published SPDs for many standard illuminants including Tungsten and twelve different flourescent types.

Therefore, in the spectral method of off-line advance calibration, either published SPD data may be used, or the test setup shown in FIG. 5 may be used to capture SPD data for a set of illumination sources and store the data in data collection and processing unit 509. The spectral method of off-line advance calibration also requires measurement of the spectral response of a camera module in order to estimate the set of G/R and G/B ratios. The spectral response of a camera module may be measured using a monochromator, an integrating sphere, a Xenon illumination source and an optical meter. A graph such as that shown in FIG. 1 is exemplary of a spectral response for a camera module at its field-of-view center, as may be obtained by the above described measurement.

After obtaining the camera module spectral response (using a monochromator as discussed above) and the spectral data (SPDs using a spectrophotometer 505) for a given illumination source, R/G/B values for the camera module under the given illumination source may then be estimated using the following equations:

$$R = \Sigma R(\lambda) \times [I(\lambda) \times S_R(\lambda)];$$

$$G = \Sigma [I(\lambda) \times R(\lambda) \times S_G(\lambda)]; \text{ and}$$

$$B = \Sigma I(\lambda) \times R(\lambda) \times S_B(\lambda);$$

In the above equations, $I(\lambda)$ represents spectral power distribution (SPD) of an illumination source, $R(\lambda)$ represents the spectral reflectance factors (SRF) of the reflecting surface of the integrating sphere and $S(\lambda)$ represents spectral response (SR) of the camera module for a specific color channel. It is noted that since the reflecting surface of the integrating sphere is practically color neutral, $R(\lambda)$ would be equal to unity ($R(\lambda) = 1$) for the whole range of visible range of wavelengths.

The integration/summation in the above three equations are performed for the visible range of wavelengths ($\lambda$: 360 nm to 720 nm—with 4 nm wavelength resolution). The G/R and G/B ratios for a target illumination source may then be readily calculated.

Therefore based on the measurement method of the embodiments, the two ratios for a set of illumination sources may be established. Subsequently, one of the ratio-sets is defined as a reference and the required scaling factors to map from the reference ratios to all other illumination-sources ratios may be estimated in advance and saved in the memory of a plurality of camera modules.

Thus, for the off-line advance calibration procedure, information is measured or otherwise obtained for a plurality of illumination sources using a given representative camera of a given model or type. The result of the off-line advance calibration procedure is a set of fixed scaling factors that may then be loaded into memory of a plurality of cameras of the same model or type, and used by each camera during white balancing.

The on-line, per camera module calibration procedure of the embodiments will now be described. During per-module calibration in the factory, by just using an illumination source that is identical to the reference illumination source defined during the off-line advance calibration procedure as was described above, the reference ratio set is calculated for that specific camera module. This reference set of ratios is saved in the camera memory as well. For per-module G/R and G/B ratio calibration, direct measurement may be performed using a test setup as was described with respect to FIG. 4. However, for the on-line per module calibration procedure, the data collection and processing unit 409 is not needed since the data will be stored directly in the camera's memory. The camera 405 is placed in position next to the calibrated white card 401, or calibrated translucent white sheet in an alternative setup, such that the camera may focus on the ROI 402 and capture an image. The image is captured and processed to extract the color ratios for the reference illumination source. The color ratios are then stored in memory, which is an integral portion of the camera 405.

Therefore the calibration setup shown in FIG. 4 is applicable to a factory line or assembly line where cameras such as camera 405 are mass produced and/or mass calibrated. For example, camera 405 may be on a conveyor line that moves horizontally and in parallel with the calibrated white card 401, and positions the camera module with respect to the ROI 402. When completed, the camera 405 moves on in the line and the next camera is positioned accordingly with respect to the ROI 402. For the on-line calibration procedure, each camera to be calibrated captures an image from a test scene. For example, in an alternative setup that was described previously above, a diffused, transparent, back-illuminated (e.g., using an LED-based D55 illumination source) scene may be employed. Lens position is set at infinity; and the camera is positioned very close to the target scene such that its center ROI 402 area is uniformly illuminated. The diffused back-illuminated scene should be uniform within a very small area since the camera is positioned very close to the scene and only the center ROI (e.g., about 64×64 pixels) of the camera is used for estimating the ratios.

The run-time, white balancing procedures, will now be described. During camera usage, run-time white balancing occurs when the end-user captures an image. An illumination source type (e.g., tungsten illumination source) is automatically established and accordingly, the required white-balancing ratio set is estimated as follows:

$$(G/R)_{Tungsten} = (G/R)_{Reference} \times (SF_R)_{Tungsten}; \text{ and}$$

$$(G/B)_{Tungsten} = (G/B)_{Reference} \times (SF_B)_{Tungsten}.$$

The two scaling factors (SF) on the right side of the above equations are retrieved from camera memory, and these scaling factors were determined during the off-line advance calibration procedure as was described above. The G/R and G/B reference ratios were obtained during the on-line per module calibration procedure for the specific camera. The ratio set (G/R and G/B) for the camera under a tungsten illumination source is then estimated as shown, based on the reference illumination source ratios and retrieved scaling factors, and then is used for white balancing.

Figure 6:
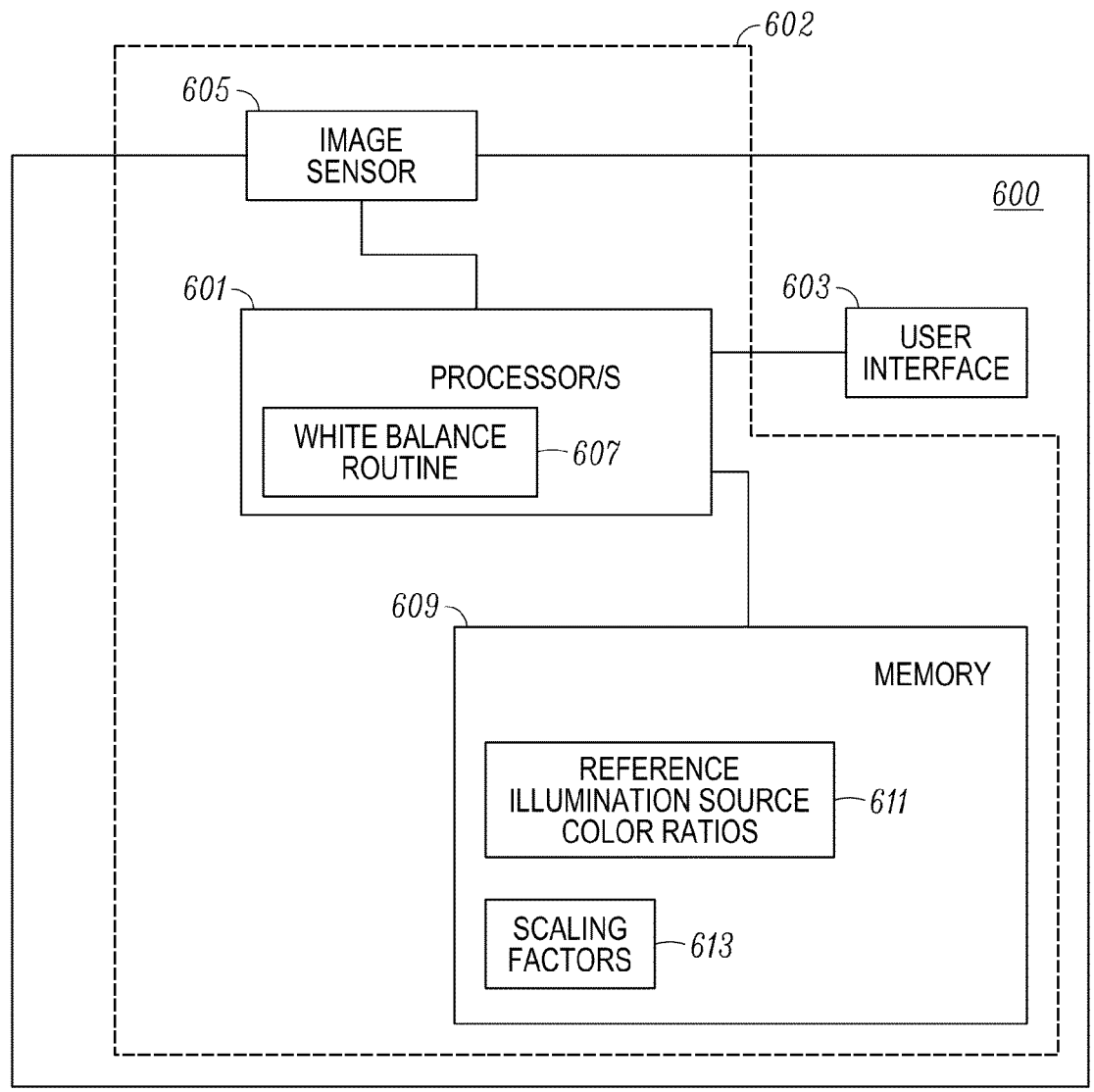
FIG. 6 is a block diagram of a camera, in accordance with the embodiments.

FIG. 6 is a block diagram of a camera 600, which may include a "camera module" 602, in accordance with the embodiments. The term "camera" as used herein is not limited to a "camera" in the traditional sense, but includes various devices that may incorporate a camera's capabilities and features, such as, but not limited to, mobile telephones, laptop PCs, etc. Further, the terms "camera" and/or "camera module" as used herein include an image sensor, including any appropriate light detecting/filtering components, and may also include one or more processors wherein "processors" as used herein includes software and/or firmware executing on one or more programmable processors, ASICs, DSPs, hardwired logic or combinations thereof, in order to perform processing on an image or otherwise from data collected via the light detecting and/or light filtering portion of the camera module. The camera module may also include a "lens" and/or a lens assembly. However, in some embodiments, the camera module will be installed in a camera housing wherein the camera housing includes the lens. Therefore, in accordance with the embodiments, the camera 600, which may include a "camera module" 602, includes processor/s 601 and memory 609, which may be separate or integrated components, for example components contained in a single electronic device and/or on a single integrated circuit or within a single integrated circuit packaging, and may be implemented in any appropriate fashion as would be understood by one of ordinary skill and would remain in accordance with the embodiments herein disclosed. That is, the camera module 602 may include the image sensor 605, the processor/s 601, and the memory 609, and may be installed in a digital camera, but may also be installed in a device such as, but not limited to, a mobile phone, laptop PC, etc. That is, the camera module 602 may include a memory 609 for storing mapping scale factors 613 that map the color ratios of at least one illumination source 611, the data for which is also stored in memory 609, to the color ratios for a plurality of other illumination sources, that is, to a set of illumination sources. The term "camera module" as used herein includes an image sensor 605 which may be any appropriate image sensor, such as, but not limited to, a charge-coupled device (CCD), CMOS chip, active-pixel sensor (APS), Bayer sensor, etc. The camera 600 therefore includes a camera module 602, which has the characteristics that needed to be calibrated as discussed above. A user interface 603 is operatively coupled to the processor/s 601, that is, couple via an internal communication bus (not shown) for sending and receiving data, which may include commands, to and from, the processor/s 601, respectively. Likewise the image sensor 605, which may include a lens, etc., is operatively coupled to the processor/s 601. The user interface 603 may include, for example, the picture button, zoom and/or focus buttons etc., and may be physical switched located on a housing such as that of a digital camera, mobile phone, etc, or may be soft switches provided by a digital image screen, etc. Therefore, a camera module 602 may provide operative coupling to couple to, and interact with, the user interfaces 603 of the camera 600.

The processor/s 601 may execute a white balance routine 607 for performing the various operations described herein. The memory 609 stores reference illumination source color ratios 611 for an illumination source selected for use as a reference. Scaling factors 613 may also be stored in memory 609 for mapping color ratios of various illumination sources to the reference illumination source color ratios 611. Therefore the processor/s 601 may read or write any of the data from or to memory 609, respectively, for performing the operations as described herein.

Figure 7:
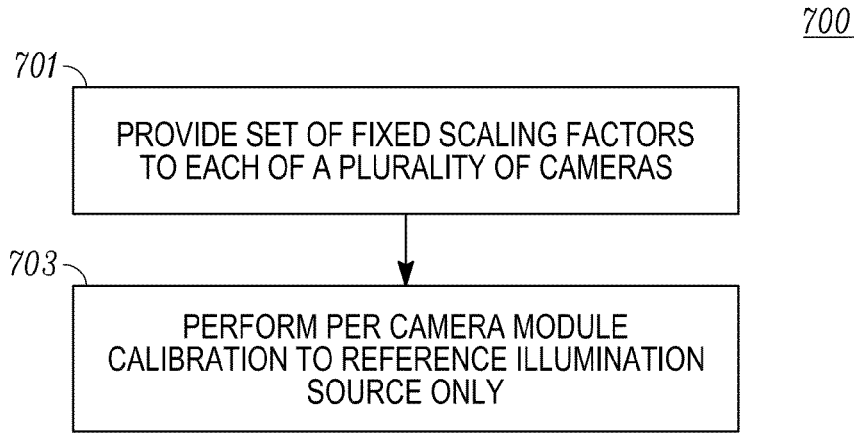
FIG. 7 is a flow chart of in factory procedures, that is, a method of determining white balance calibration scale factors for a plurality of cameras for a plurality of illumination sources using only one illumination source measurement per camera in accordance with the embodiments.

FIG. 7 is a flow chart of in factory procedures, that is, a method of determining white balance calibration scale factors for a plurality of cameras for a plurality of illumination sources using only one illumination source measurement per camera in accordance with the embodiments. In 701, each camera of a plurality of cameras is provided with a set of fixed scaling factors which each camera stores in memory. These fixed scaling factors were previously determined using a similar camera model or type, during the off-line advance calibration procedure. In 703, each camera of the plurality of cameras performs an on-line calibration procedure by capturing a test image using the reference illumination source and storing the color ratios in memory. The reference illumination source used in on-line calibration is the same illumination source established as a reference during off-line advance calibration.

Figure 8:
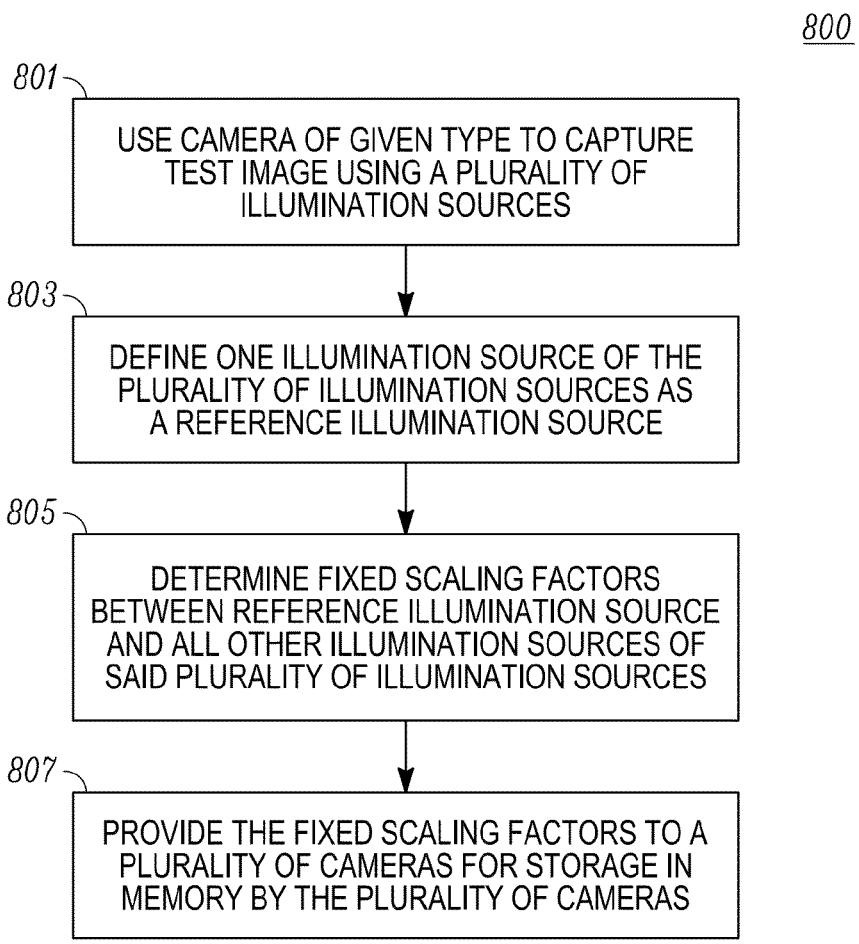
FIG. 8 is a flow chart of the direct-capture method of off-line advance calibration for establishing color ratios fixed scaling factors.

FIG. 8 is a flow chart of the direct-capture method of off-line advance calibration for establishing color ratios fixed scaling factors. In 801, a camera of a given type or model is used to capture a test image using a plurality of illumination sources. In 803, one of the plurality of illumination sources is defined as a reference illumination source. Fixed scaling factors between the reference illumination source and mapping to the various other illumination sources are established in 805. In 807, the set of fixed scaling factors are provided to a plurality of cameras of the same model or type as that used in 801.

Figure 9:
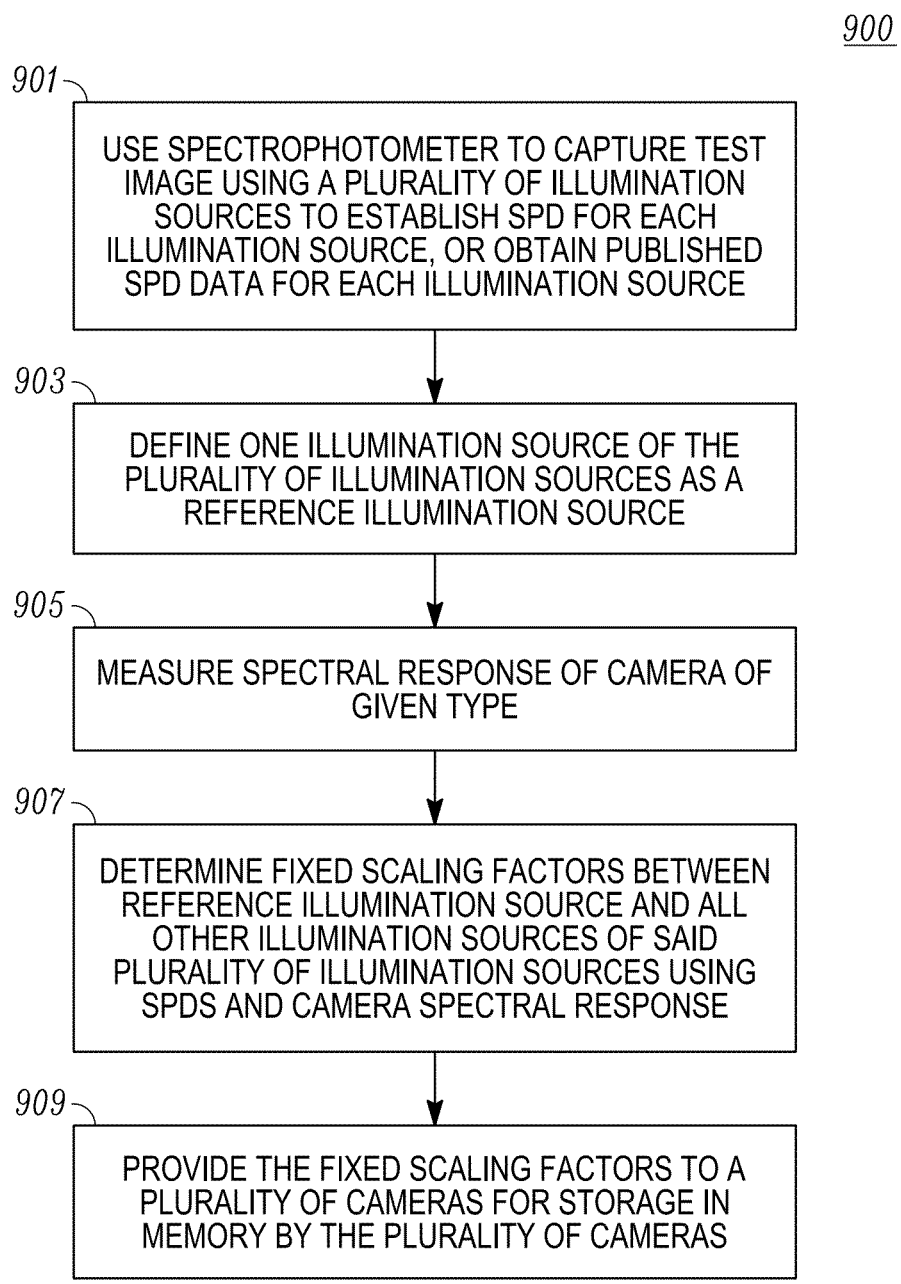
FIG. 9 is a flow chart of the spectral method of off-line advance calibration for establishing color ratios fixed scaling factors.

FIG. 9 is a flow chart of the spectral method of off-line advance calibration for establishing color ratios fixed scaling factors. In 901, a spectrophotometer is used to establish SPD data for plurality of illumination sources. Alternatively, published SPD data may be obtained. One of the plurality of illumination sources is defined as a reference in 903. In 905, the spectral response of a camera of a given model or type is measured. In 907, fixed scaling factors between the reference illumination source and mapping to the various other illumination sources are established using the SPD data and the camera spectral response. In 909, the set of fixed scaling factors are provided to a plurality of cameras of the same model or type as that measured in 905.

Figure 10:
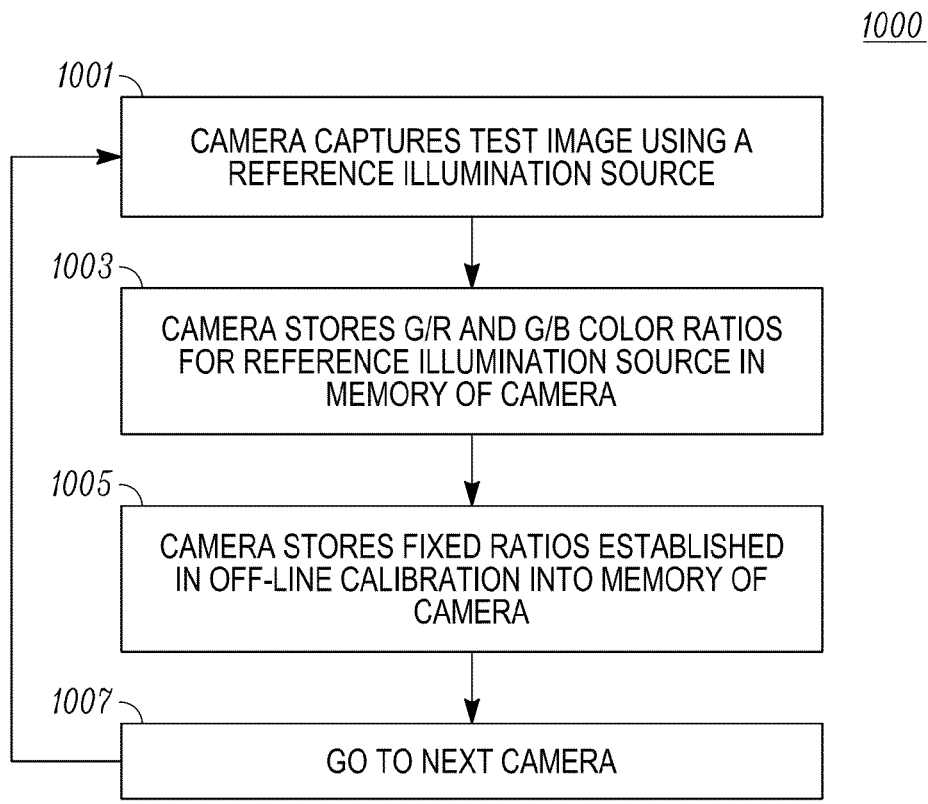
FIG. 10 is a flow chart of on-line per camera module calibration to determine a specific camera's color ratios using a reference illumination source.

FIG. 10 is a flow chart of on-line per camera module calibration to determine a specific camera's color ratios using a reference illumination source. In 1001, a specific camera captures a test image using the same reference illumination source as was defined in the off-line advance calibration procedure. The camera stores the color ratios for the reference illumination source in the camera memory as shown in 1003. In 1005, the camera obtains, via download, upload, etc., the fixed ratios established during the off-line calibration for cameras of the same model or type. As shown in 1007, the process repeats for a desired number of cameras, that is, the process may be repeated for a plurality of cameras.

Figure 11:
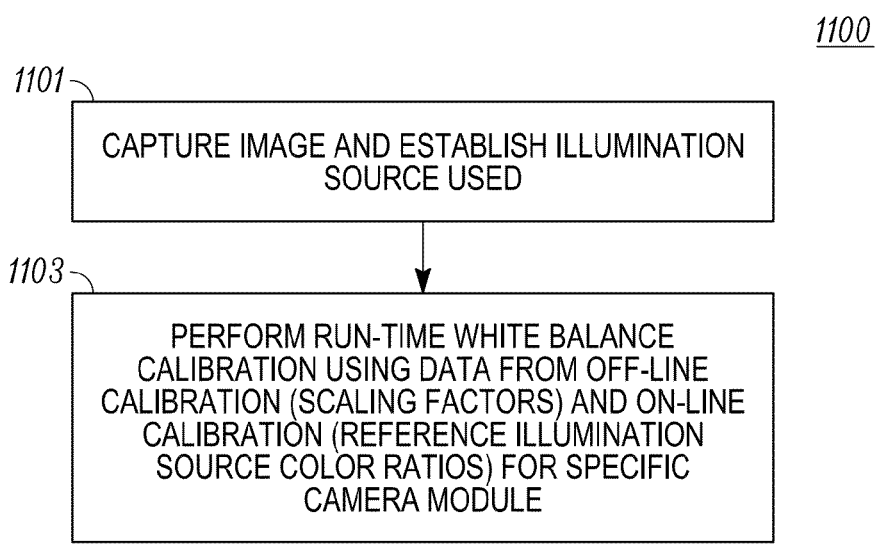
FIG. 11 is a flow chart of run-time white balancing calibration for a specific camera in accordance with the embodiments.

FIG. 11 is a flow chart of run-time white balancing calibration for a specific camera in accordance with the embodiments. A camera module captures an image by taking a picture as shown in 1101. In 1103, the camera uses the white balance routine, such as white balance routine 607, to perform run-time white balancing and uses the reference illumination source color ratios established during the on-line per module calibration procedure, and also the fixed scaling factors 613 established during the off-line calibration procedure.

Figure 12:
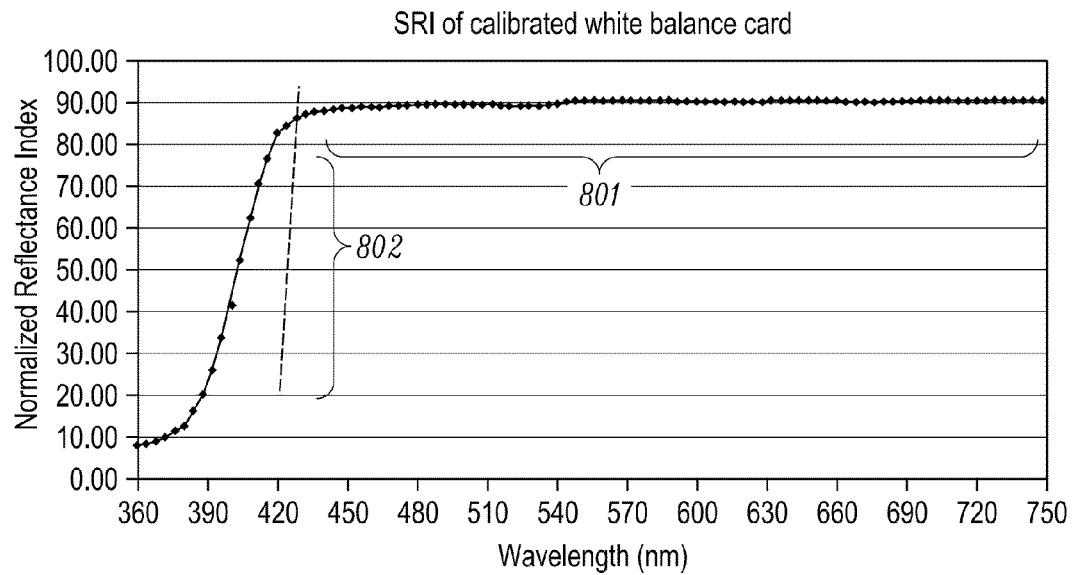
FIG. 12 is a graph of the spectral reflectance index of a calibrated white balance card and showing a region of spectral response that is similar to a desirable color neutral calibration illumination source.

FIG. 12 is a graph of the spectral reflectance index of a calibrated white balance card and showing a region 1201 of spectral response that is similar to a desirable color neutral calibration illumination source. However, as seen from region 1202 the white card in not color neutral in the range of approximately 360 nm to 420 nm. The non-color neutral region 1202 would impact any surfaces and illumination sources that have spectral components in the 360 nm to 420 nm range. Therefore, it is desirable to use a light source that would produce the color neutral region 1001. However, while desirable, this is not required in the various embodiments.

Figure 13:
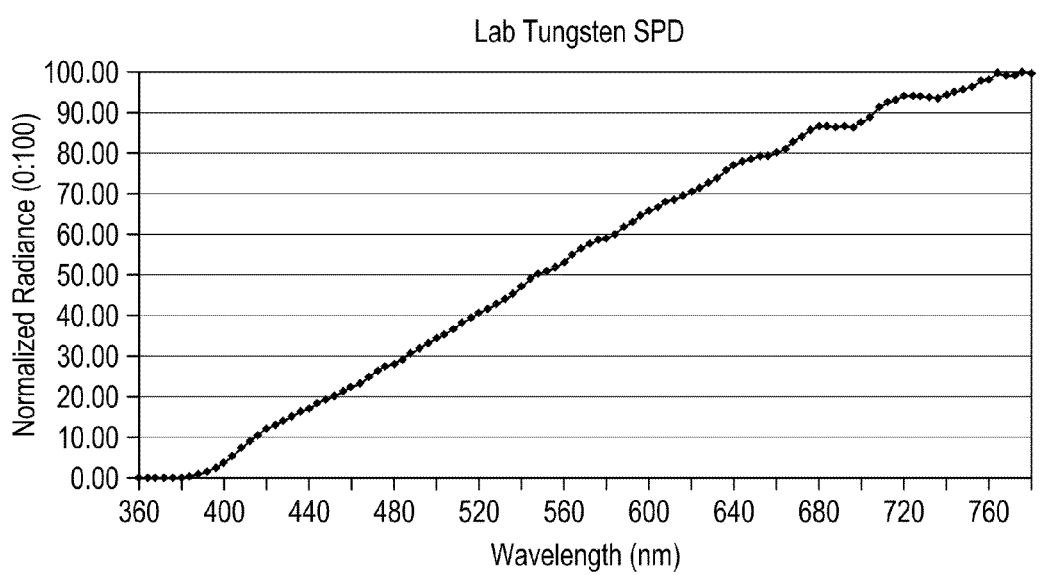
FIG. 13 is a graph of a spectral power distribution of a tungsten illumination source.
Figure 14:
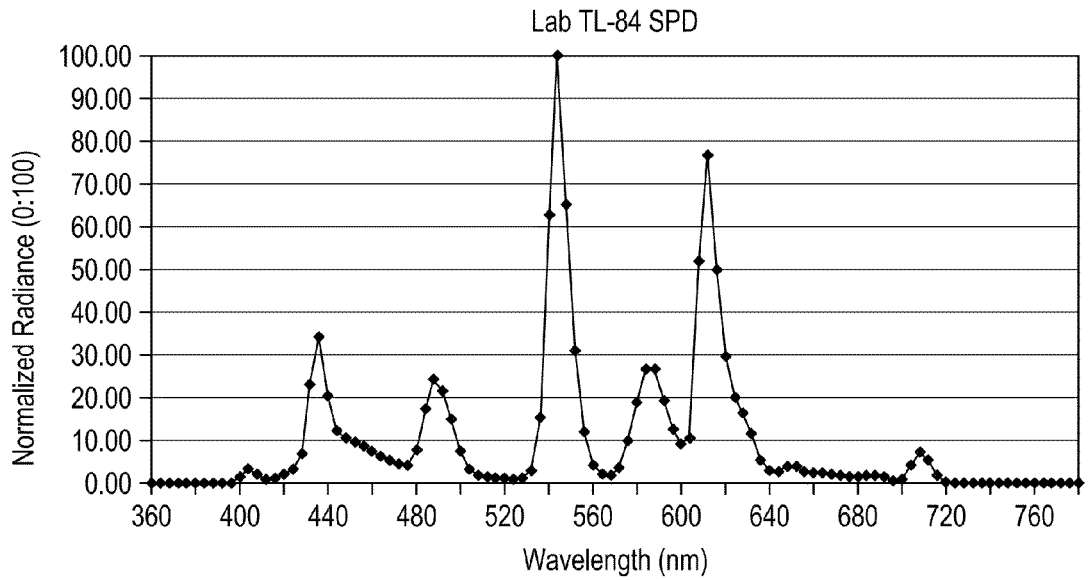
FIG. 14 is a graph of a spectral power distribution of a TL-84 illumination source.
Figure 15:
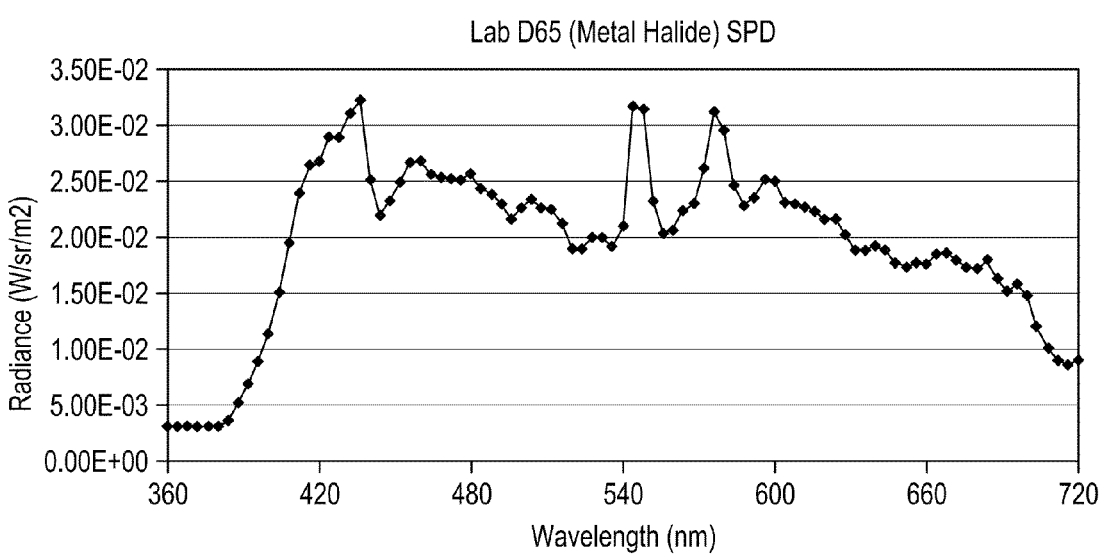
FIG. 15 is a graph of a spectral power distribution of a metal halide illumination source.

FIGS. 13, 14 and 15 are spectral power distribution graphs for Tungsten, TL-84 and metal halide illumination sources, respectively. The graphs are not normalized with respect to the calibrated white balance card illustrated in FIG. 12 however. Although as discussed above, an illumination source that is as color neutral as possible is desirable for the single illumination source methods herein disclosed, any illumination source may be used, such as, but not limited to, the illumination sources having spectral characteristics as illustrated in FIGS. 13, 14 and 15.

FIG. 16 through FIG. 20 are data tables illustrating further details of the methods employed for the various embodiments and provide example values for various related scale factors and illustrate the advantages achieved by the various embodiments. For example, FIG. 16 is a table (Table 1) of Green/Red and Green/Blue ratios for four exemplary camera modules (A, B, C and D) and for three different illumination sources, obtained by the "direct capture" method. A calibrated reflectance surface was used and is based on a Bayer/Raw image without additional processing, and an ROI at the center of the image. The ratios are averaged as G/((G1+G2)/2). It is notable that the total deviation percentage for G/R is approximately 2.5 times higher than for G/B under all illumination sources as seen in Table 1, and this point must be accounted for when error analysis is performed.

FIG. 17 is a table (Table 2) of spectral based Green/Red and Green/Blue ratios for the same four exemplary camera modules using an approximately color neutral illumination source (Xenon) in accordance with the embodiments. Returning briefly to the graphs of FIG. 1 and FIG. 2, the exemplary camera modules' (A, B, C and D) spectral response curves as shown have been established by normalizing the extracted data from collected spectral images with measured irradiance levels (uW/m2) corresponding to wavelengths 360 nm to 720 nm. Integration (over the 360 nm to 720 nm wavelength range) after this normalization process is, in accordance with the various embodiments, equivalent to making the total effect of the illumination source (Xenon in the example) as a color-neutral illumination source. This technique may be used in the various embodiments to simplify many complex spectral-based image processing and various camera calibration processes (e.g., pre-gain estimation, lens falloff estimation, cc matrices estimation—under various illumination sources) as described further herein.

In FIG. 17, Table 2, the total deviation, in percentage, for a color-neutral illumination source compared to the above three illumination sources indicated in Table 1 of FIG. 16, is a bit higher for G/R and a bit lower for G/B. However, both Tables 1 and 2 show that the total deviation for G/R is about 2.5 to 3.0 timers higher than G/B.

Table 3 of FIG. 18 provides Green/Red and Green/Blue ratios for the four exemplary camera modules, and for the three different illumination sources, determined using spectral-based methods in accordance with the embodiments. A comparison of the G/R and G/B ratio data for direct-capture and spectral-based methods shows similar trends in total deviation percentages for each ratio under each illumination source; and the relative significance of the total deviation percentage of G/R and G/B. Thus, in the various embodiments, either the direct-capture method of the spectral based method may be used for the off-line calibration phase.

FIG. 19 is a table (Table 4) of differences in results obtained using the spectral based method versus the direct-capture method for Green/Red and Green/Blue ratios for the four exemplary camera modules and for the three different illumination sources, and FIG. 20, Table 5, illustrates the corresponding percentage differences. Making use of the methods and apparatuses of the present disclosure, an error of approximately 4% may be achieved. For Table 5, the difference in percentage is defined as (Direct Data−Spectral Data)/Direct Data. Table 5 illustrates that the amount of difference for G/B is very small under all illumination sources, that is, less than about 1%. Also, the amount of difference for G/R is much higher than for G/B. However, the G/R difference is still, in majority of cases, less than 3% under all three illumination sources.

There are multiple potential sources of error in generating spectral-based data. However, by addressing these potential sources of error for the various embodiments, the difference between the direct-capture method and spectral method is minimized. Such sources of error include Monochromator Xenon arc lamp fluctuation; Non-optimal camera/integrating-sphere relative position; Non-simultaneous image capture and irradiance measurement; Not using the same spot on the calibrated white balance card (and not using the same location for camera and spectrophotometer) for direct-image capture and spectral measurement of illumination sources.

FIG. 21 is a table (Table 6) illustrating an exemplary mapping of color neutral illumination data to Tungsten, TL-84 and D65 metal halide illumination sources in accordance with the embodiments. The data shown in Table 6 indicates that the mapping G/R and G/B ratios based on an approximately color-neutral illumination source to G/R and G/B ratios based on a specific illumination source (e.g., Tungsten, Tl-84 and D65) requires fixed scale factors, and that these fixed scale factors are independent of module to module variation. Further, since the mapping scale factors between the approximately color-neutral illumination source to any other illumination source are fixed, then the mapping between any illumination source to any other illumination source is also fixed and may thus be determined.

Based on these observations, in accordance with the embodiments, a procedure for in-factory per-module calibration of G/R and G/B ratios for various required illumination sources includes an off-line characterization wherein an SPD of a spectrally-stable illumination source is established. For example, an LED-based D55 illumination source may be used as it provides a close approximation of a color-neutral illumination source. Based on the SPD of the selected illumination source, mapping scale factors for all the required illumination sources (e.g., Tungsten, Tl-84, indoor D65, outdoor D50, D55, D60 and D65) are established.

The procedure of the embodiments further includes an on-line, in-factory per-module calibration wherein each camera module captures an image from, for example, a diffused, transparent, back-illuminated (using for example an LED-based D55 illumination source) scene. Lens position is set at infinity, and the camera module is positioned very close to the target scene such that its center ROI area is uniformly illuminated. It is noted that the diffused back-illuminated scene should be uniform within a very small area since the camera is positioned very close to the scene and as well only the center ROI (about 64×64 pixels) of the camera is used for estimating the ratios.

G/R and G/B ratios for all target illumination sources are estimated using the G/R and G/B ratios established in the on-line calibration phase and the scale factors that are estimated in advance in the off-line characterization phase.

Thus methods and apparatuses for determining mapping G/R and G/B ratios based on a color-neutral illumination source to G/R and G/B ratios based on a specific illumination source (e.g., Tungsten, Tl-84 and D65) using fixed scale factors, wherein the fixed scale factors are independent of module to module variation, have been disclosed. The various embodiments having mapping scale factors between a color-neutral illumination source and any other illumination source as fixed, may use the relationship to determine the mapping between any illumination source to any other illumination source, and requires only a single illumination source measurement for this purpose. An off-line characterization process and an on-line in-factory per-module calibration process for G/R and G/B ratio estimation under any set of target illumination sources, in accordance with the embodiments, therefore uses only a spectrally-stable illumination source, such as, but not limited to, an LED-based D55 illumination source.

While the present disclosure has used as exemplary scaling factors, G/R and G/B ratios, other color ratios may be used and would remain in accordance with the various embodiments herein disclosed. For example, magenta, yellow and cyan may be used and corresponding ratios obtained thereby in accordance with the embodiments.

What is claimed is:

1. A method comprising:
    determining white balance calibration color ratios for a camera module using a reference illumination source, by capturing an image using said camera module, with said image being illuminated by said reference illumination source;
    receiving white balance calibration scaling factors mapping color ratios for a plurality of other illumination sources to said color ratios of said reference illumination source established by using a separate representative camera module, of a same type as said camera module, to directly capture a plurality of test images including a test image illuminated by said reference illumination source and test images illuminated by each of said plurality of other illumination sources; and
    storing in a memory the received white balance calibration scaling factors mapping color ratios for the plurality of other illumination sources to said color ratios of said reference illumination source.

2. The method of claim 1, comprising:
    capturing an image under at least one of said plurality of other illumination sources using said camera module; and
    estimating color ratios for said at least one other illumination source by multiplying said white balance calibration color ratios for said reference illumination source by said scaling factors.

3. The method of claim 1, wherein the white balance calibration scaling factors mapping color ratios for the plurality of other illumination sources to said color ratios of said reference illumination source, comprise white balance calibration scaling factors for at least one of: Tungsten, TI-84, indoor D65, outdoor D50, D55, D60 or D65 illumination sources.

4. The method of claim 1, wherein determining white balance calibration color ratios for a camera using a reference illumination source, further comprises:
    determining white balance calibration color ratios for a spectrally-stable, LED-based D55 illumination source.

5. The method of claim 1, wherein said white balance calibration color ratios for a reference illumination source are expressed as a set of green to red and green to blue ratios.

6. A method comprising:
    determining, in advance, mapping scale factors between a first illumination source color ratio set and a plurality of illumination source color ratio sets for a plurality of illumination sources, said mapping scale factors being determined by using a separate representative camera module, representative of a same type camera module as a plurality of camera modules, to directly capture a plurality of test images including a test image illuminated by said first illumination source and test images illuminated by each illumination source of said plurality of illumination sources;
    providing said mapping scale factors to said plurality of camera modules for storage in memory; and
    calibrating each camera module of said plurality of camera modules by capturing with each camera module only a single test image illuminated by said first illumination source, wherein each camera module of said plurality of camera modules, after calibration, performs white balancing for any of said plurality of illumination sources using color ratios of said first illumination source obtained by capturing said single test image and said mapping scale factors.

7. The method of claim 6, wherein determining, in advance, mapping scale factors between a first illumination source color ratio set and a plurality of illumination source color ratio sets for a plurality of illumination sources, further comprises:
    determining, in advance, white balance calibration color ratios for a spectrally-stable, LED-based D55 illumination source as said first illumination source.

8. A camera module comprising:
    a processor configured to:
        determine white balance calibration color ratios for said camera module using a reference illumination source, by capturing an image using said camera module, with said image being illuminated by said reference illumination source;
        receive white balance calibration scaling factors mapping color ratios for a plurality of other illumination sources to said color ratios of said reference illumination source established using a separate representative camera module, of a same type as said camera module, to directly capture a plurality of test images including a test image illuminated by said reference illumination source and test images illuminated by each of said plurality of other illumination sources; and
    store the received white balance calibration scaling factors mapping color ratios for the plurality of other illumination sources to said color ratios of said reference illumination source.

9. The camera module of claim 8, wherein said processor is further configured to:
    capture an image under at least one of said plurality of other illumination sources using said camera module; and
    estimate color ratios for said at least one other illumination source by multiplying said white balance calibration color ratios for said reference illumination source by said scaling factors.

10. The camera module of claim 9, further comprising:
    a memory coupled to said processor, said memory storing white balance calibration color ratios for said reference illumination source, and said white balance calibration scaling factors, wherein said processor estimates color ratios for said at least one other illumination source by multiplying said white balance calibration color ratios for said reference illumination source by a scaling factor for said at least one other illumination source.

11. A non-transitory computer readable medium comprising: executable instructions for execution by at least one processor, that when executed cause the at least one processor to:

determine white balance calibration color ratios for a camera module using a reference illumination source, by capturing an image using said camera module, with said image being illuminated by said reference illumination source;

receive white balance calibration scaling factors mapping color ratios for a plurality of other illumination sources to said color ratios of said reference illumination source established using a separate representative camera module, of a same type as said camera module, to directly capture a plurality of test images including a test image illuminated by said reference illumination source test images illuminated by each of said plurality of other illumination sources; and store the received white balance calibration scaling factors mapping color ratios for the plurality of other illumination sources to said color ratios of said reference illumination source.

12. The non-transitory computer readable medium of claim 11, wherein said executable instructions, when executed, further cause the at least one processor to:

capture an image under at least one of said plurality of other illumination sources using said camera module; and estimate color ratios for said at least one other illumination source by multiplying said white balance calibration color ratios for said reference illumination source by said scaling factors.

13. The non-transitory computer readable medium of claim 11, wherein said executable instructions, when executed, further cause the at least one processor to:

determine white balance calibration color ratios for a reference illumination source using spectral data for said reference illumination source and camera module spectral characteristic data.

14. The non-transitory computer readable medium of claim 11, wherein said executable instructions, when executed, further cause the at least one processor to:

determine white balance calibration scaling factors mapping color ratios for said plurality of other illumination source to said color ratios of said reference illumination source, by determining white balance calibration scaling factors for at least one of: Tungsten, TI-84, indoor D65, outdoor D50, D55, D60 or D65 illumination sources.

15. The method of claim 1, wherein determining white balance calibration color ratios for a camera module includes calibrating the camera module by capturing only a single test image illuminated by said reference illumination source, the camera module, after calibration, performing white balancing for said plurality of other illumination sources using color ratios of said reference illumination source obtained by capturing said single test image and said calibration scaling factors.

16. The camera module of claim 8, wherein said processor is further configured to:

calibrate the camera module by capturing only a single test image illuminated by said reference illumination source, the camera module, after calibration, performing white balancing for said plurality of other illumination sources using color ratios of said reference illumination source obtained by capturing said single test image and said calibration scaling factors.

17. The non-transitory computer readable medium of claim 11, wherein said executable instructions, when executed, further cause the at least one processor to:

calibrate the camera module by capturing only a single test image illuminated by said reference illumination source, the camera module, after calibration, performing white balancing for said plurality of other illumination sources using color ratios of said reference illumination source obtained by capturing said single test image and said calibration scaling factors.

* * * * *